United States Patent Office 2,716,662
Patented Aug. 30, 1955

2,716,662

POLYCYCLIC DIBASIC ACIDS

Charles A. Cohen, Roselle Park, and Louis A. Mikeska, Westfield, N. J., assignors to Esso Research and Engineering Company, a corporation of Delaware No Drawing. Application January 24, 1952,
Serial No. 268,122

11 Claims. (Cl. 260—514)

This invention relates to the production of polycyclic dibasic acids. More particularly it is concerned with a novel process for the production of dicarboxylic acids derived primarily from cyclopentadiene or an alkyl-substituted cyclopentadiene, namely methyl cyclopentadiene or mixtures of cyclopentadiene and alkyl-substituted cyclopentadienes.

Starting with cyclopentadiene one obtains according to the process of this invention, alpha-dicyclopentadiene-3.7-dicarboxylic acid which was first prepared by Thiele: Berichte 34, 68 (1901) by treating cyclopentadiene with metallic potassium with subsequent gassing of the potassium cyclopentadiene with carbon dioxide at atmospheric pressure. Decomposition of the di-potassium salt with acid yielded the above dicyclopentadiene dicarboxylic acid. As he stated in a footnote, Thiele's attempts to cause cyclopentadiene to react with sodium were unsuccessful.

It has now been found that dicyclopentadiene dicarboxylic acid and other dialkyl homologues of this acid may be readily prepared in high yields by reacting metallic sodium which has been dispersed to a finely divided state, that is, to an average particle size of less than 50 microns in diameter, with monomeric cyclopentadiene or alkyl cyclopentadiene in the presence of a small amount of an anhydrous alcohol activator, followed by conversion of the sodium cyclopentadienes to acid by treatment with $CO_2$ preferably at superatmospheric pressures up to 1000 p. s. i g.

The sodium employed in this reaction is in the form of a finely divided dispersion wherein the particles have an average size of less than 50 microns in diameter. Dispersion is obtained, for example, by mechanical means either with or without the aid of emulsifying or dispersing agents. The alcohol activator is substantially anhydrous alcohol, such as the low molecular weight aliphatic alcohols such as methanol, ethanol, isopropanol, etc. Alcohols containing up to four carbon atoms per molecule are suitable but methanol, ethanol or isoproponal are preferred. The alcohol is employed in relatively small amounts, that is, less than 1 molecule based on the sodium and usually in amounts less than 1/10 mol equivalent. The alcohol serves to activate the sodium either by removing surface impurities contained thereon or by forming small quantities of sodium alcoholate. Gassing with carbon dioxide is carried out at pressures above atmospheric, up to 1000 p. s. i. g., for best yields. Good reaction is obtained at 50 to 1000 lbs. but since the tank pressure of $CO_2$ as handled commercially is usually about 900 to 1000 p. s. i. g. this latter pressure is preferred.

While frequent reference is made in the literature to the use of metallic potassium for reacting with the methylene group of cyclopentadiene so as to form cyclopentadienyl potassium, no references have been found where the corresponding sodium salt was made by direct reaction of sodium with cyclopentadiene. If sodium is previously dispersed to a very finely divided state, preferably having a particle size of less than 50 microns in diameter, e. g., by mixing with xylene, heating to above the melting point of the sodium and then passing the mixture through a high-speed colloid mill and continuing the operation until the temperature falls below the solidification point of the sodium, one obtains the sodium in a highly reactive state. With sodium in such a finely divided state some reaction may be obtained with cyclopentadiene, but the reaction tends to be relatively slow. If to a gram mole of dispersed sodium there is added 1 to 2 grams of anhydrous ethyl or isopropyl alcohol so as to activate the sodium either by removing, by means of solution, surface impurities or by forming small quantities of sodium alcoholate, immediate reaction may be obtained when a mole of monomeric cyclopentadiene is added to the dispersed sodium. Under these conditions the cyclopentadienyl sodium is readily formed, and when this sodium salt is then transferred to a suitable pressure-resistant vessel and treated at superatmospheric pressure with carbon dioxide one obtains almost exclusively the disodium salt of the dicyclopentadiene dicarboxylic acid having a minimum of sodium carbonate or bicarbonate present. In distinction to the use of carbon dioxide under pressure, if one gasses the mixture of the sodium or potassium cyclopentadiene with carbon dioxide at atmospheric pressure a large proportion of the mixture ends up as sodium carbonate or bicarbonate, giving ultimately poor yields of the desired dicarboxylic acid.

The dicyclopentadiene dicarboxylic acid has many useful properties industrially, e. g., higher alcohol esters of either the unsaturated acid or the fully hydrogenated acid are useful as solvents and plasticizers for resins and coating materials. It is also useful as a modifier for the production of alkyd resins when mixed with other suitable ingredients and may serve as a basic material for the production of polyester types of lubricants, as an ingredient of specialty greases and as a source of other compounds.

The following examples will more definitely illustrate the process of this invention:

*Example 1.—Cyclopentadienyl sodium*

Twenty-three grams of sodium is added to 500 ml. of xylene contained in a one-liter stainless steel beaker which is heated by means of a hot plate to a temperature of 120°–125° C. At this point a homogenizer-type of mixer, available commercially as a "Homomixer," is immersed into the mixture of molten sodium in xylene and the mixer run for a period of approximately 15 seconds. At the completion of the run, the mixer is rinsed with approximately 100 ml. of xylene so as to wash off occluded sodium, and the entire mixture of dispersed sodium in xylene transferred to a one-liter flask fitted with an efficient stirrer, thermometer, dropping funnel, and reflux condenser.

To the well-stirred mixture is then added 80 g. of freshly cracked and distilled monomeric cyclopentadiene boiling at 40°–41° C., representing a 20% excess of the diolefin over the sodium. Just prior to addition of the diolefin there is added to the flask one or two ml. of anhydrous ethanol or isopropanol. With addition of the diolefin an immediate rise in temperature is noted, and the temperature of the flask contents is maintained within the limits of 30°–35° C. by means of external cooling, using if necessary, a bath composed of solid carbon dioxide and alcohol. Addition time for the diolefin is usually in the neighborhood of one hour, and further stirring is continued for at least another hour at the same temperature in order to insure full reaction. The sodium changes from a dark gray powder to a voluminous precipitate having a white to a light gray appearance.

The cyclopentadienyl sodium may be reacted with alkyl halides, acid chlorides or esters of chloroacetic acid to give respectively: 3:7 dialkyl dicyclopentadiene, diketones of dicyclopentadiene, and bis (carboxymethyl esters) of dicyclopentadiene.

*Example 2.—Disodium alpha-dicyclopentadiene 3,7 dicarboxylic acid*

The flask contents from Example 1 are then charged to a bomb capable of withstanding pressure in excess of 1000 lbs. The bomb should be of a suitable resistant material such as stainless steel, nickel, Inconel, Monel or maybe a silver-lined bomb. The bomb is fastened into a shaking machine and charged with full tank pressure of carbon dioxide which will normally be within the limits of 900–1000 lbs. per sq. in. gage. When charging with carbon dioxide an immediate rise in temperature is noted and a fall in pressure in a closed system occurs indicating rapid reaction of the carbon dioxide. The system is repressured over a period of ½ hour to full tank pressure until no further pressure drop is noted. The mixture is then allowed to shake for a period of approximately 12 hours, during which time the initial rise in temperature to about 60° C. may be increased by external heating to about 100° C. Additional heating is not entirely necessary in order to obtain complete reaction but does hasten the reaction time so that with heating, as little as 2 hours is sufficient. Shorter times may be employed if better mixing is available, such as propeller or turbo mixers. At the completion of the run the excess carbon dioxide is bled off, the bomb contents dumped into a Büchner funnel, and the salt washed with light naphtha or ethyl ether in order to remove excess solvent and small amounts of polymer. There is obtained a yield of from 128 to 134 g. of product varying in color from white to a light cream color. The material has a low density and very fine particle size, exhibiting fluid flow characteristics in a dry state.

*Example 3.—Alpha-dicyclopentadiene 3,7 dicarboxylic acid*

The sodium salt prepared in Example 2 is conveniently converted to the free acid by dissolving the salt in water, boiling for a few minutes and precipitating the acid by addition of dilute HCl and recovering the acid crystals by filtration. The crude product is recrystallized from approximately 50% aqueous methanol or approximately 70% aqueous acetic acid. A perfectly white crystalline acid is obtained having a melting point of 210° C. and a neutralization equivalent equal to 509 mgm. KOH/gm. It possesses the following structural formula:

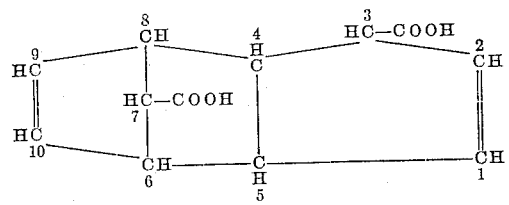

The above reactions described in Examples 1, 2, and 3 are believed to be adequately described by the following series of equations:

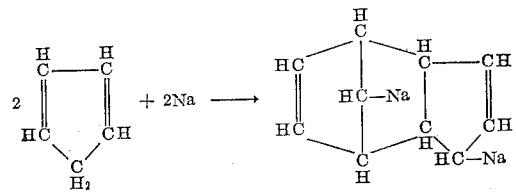

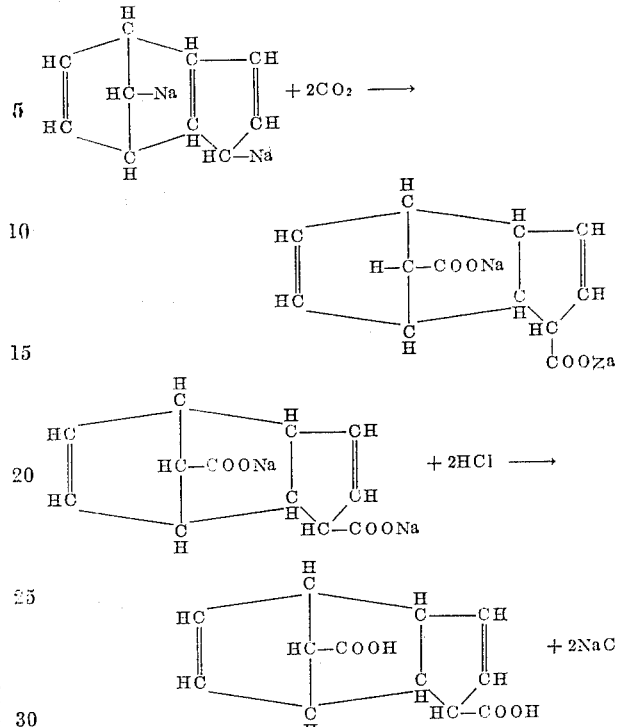

*Example 4.—Disodium dimethyl dicyclopentadiene dicarboxylic acid*

Seventy-five grams of methylcyclopentadiene (boiling point 73° C.) was reacted at a temperature of 30° C. with 23 grams of sodium dispersed in 500 ml. of xylene previously activated with 1 ml. of anhydrous isopropanol. The sodium salt was then transferred to a silver-lined bomb having a capacity of 1.8 liters and charged with $CO_2$ at a gage pressure of 940#/sq. inch. An immediate rise in temperature and a drop in pressure occurred indicating extensive reaction. The bomb was repressured and allowed to shake for 3 hours without additional heating being applied.

On opening the bomb, filtering the solid and washing with ether a white solid salt was obtained weighing 135.8 grams. Decomposition of the salt with acid and recrystallization from 70% acetic acid yielded a white acid, melting at 222–223° C. having a neutralization equivalent of 452 mgm. KOH/gm. Analysis by combustion gave the following:

|  | Found | Theor. $C_{14}H_{16}O_4$ |
|---|---|---|
| Percent Carbon | 67.12 | 67.72 |
| Percent Hydrogen | 6.63 | 6.50 |

The following equations represent the chemical reactions involved in this preparation.

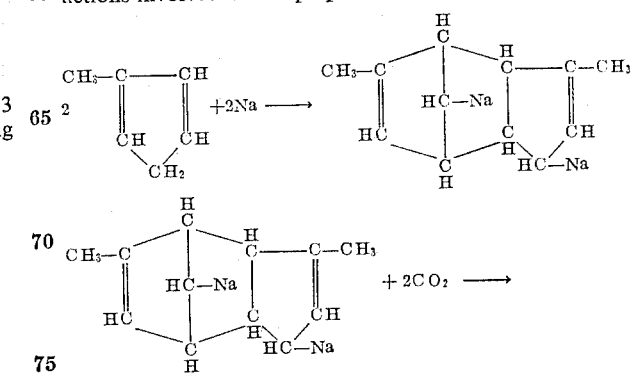

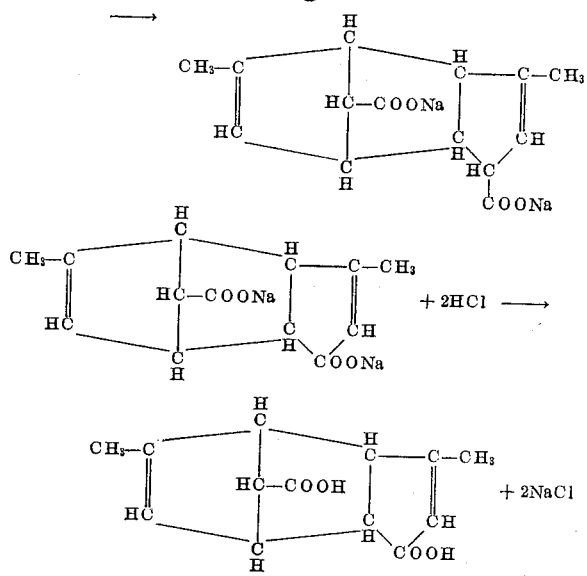

NOTE.—Position of methyl radical (CH₃) shown in above equations is not known with certainty, and is for illustration only.

*Example 5.—Tetrahydrodicyclopentadiene - 3:7 dicarboxylic acid*

Twenty-two grams of a dicyclopentadiene-3:7 dicarboxylic acid (0.1 mol) was dissolved in 400 ml. of anhydrous ethanol contained in a pressure bottle, 100 mgm. of Adams' PtO₂ catalyst added, the air exhausted from the bottle and then filled with hydrogen to 41 p. s. i. g. On shaking, there was an immediate absorption of hydrogen until the pressure dropped to 31.5 p. s. i. g. representing 0.2 mol. of hydrogen absorbed. The alcoholic solution was filtered to remove the catalyst and the alcohol evaporated from the solution on a steam bath under an atmosphere of nitrogen. The residue was crystallized from 100 ml. of 50% ethanol. Obtained product as snow-white crystals. Melting point 193°–194° C. on copper bar.

Titration of a sample weighing 0.3143 grams required 27.15 ml. of 0.1034 N alkali. Equivalent weight=112.0. Theor.=112.1.

Reduction of dimethyl dicyclopentadiene dicarboxylic acid in the same manner as above yields the tetrahydro acid.

Although the above examples describe the preparation of dicarboxylic acids from relatively pure cyclopentadiene and methyl cyclopentadiene, good yields of high quality acids are also obtained by reacting mixtures of these two components, for example, suitable mixtures may contain 90–10% of cyclopentadiene and 90–10% of methyl cyclopentadiene. In addition, vapor phase steam-cracked hydrocarbons boiling in the range of cyclopentadiene and methyl cyclopentadiene containing paraffins and aromatics as diluents may also be employed. The products comprise a mixture of the two acids, namely, alpha-dicyclopentadiene 3,7-dicarboxylic acid and dimethyldicyclopentadiene 3,7-dicarboxylic acid.

Having described the invention, what is claimed is:

1. A process for producing reaction products of sodium and a compound selected from the group consisting of cyclopentadiene and alkyl derivatives of cyclopentadiene which comprises reacting finely divided sodium having an average particle size less than 50 microns in diameter with said compound in the presence of less than 1 molar equivalent based on the sodium of a substantially anhydrous aliphatic alcohol activator.

2. A process according to claim 1 wherein the activator is an anhydrous aliphatic alcohol of 2 to 3 carbon atoms which is present in an amount less than 1/10 mole equivalent based on the sodium.

3. A process for the preparation of disodium dicyclopentadiene dicarboxylic acid which comprises reacting finely-dispersed sodium having an average particle size of less than 50 microns in diameter with monomeric cyclopentadiene in the presence of less than 1 molar equivalent based on the sodium of substantially anhydrous aliphatic alcohol, thereafter treating the reaction product with carbon dioxide at superatmospheric pressure.

4. A process according to claim 3 in which the superatmospheric pressure is a pressure up to 1000 p. s. i. g.

5. A process for producing disodium dimethyl alpha-dicyclopentadiene 3,7 dicarboxylic acid which comprises reacting finely-dispersed sodium having an average particle size of less than 50 microns in diameter with methylcyclopentadiene in the presence of less than 1 molar equivalent based on the sodium of substantially anhydrous aliphatic alcohol and thereafter treating the product with carbon dioxide at superatmospheric pressure.

6. A process according to claim 5 in which the superatmospheric pressure is a pressure up to 1000 p. s. i. g.

7. Disodium dicyclopentadienyl.

8. Disodium dimethyldicyclopentadienyl.

9. A process for the production of dicyclodienyl dicarboxylic acid which comprises reacting finely dispersed sodium having an average particle size of less than 50 microns in diameter with a monomeric cyclodiene selected from the group consisting of cyclopentadiene, alkyl-substituted cyclopentadienes and mixtures thereof in the presence of less than one molar equivalent based on the sodium of substantially anhydrous aliphatic alcohol to obtain a reaction product containing the disodium dicyclodienyl derivative of said cyclodiene, converting the reaction product to disodium dicyclodienyl dicarboxylic acid by treating the reaction product with CO₂ at superatmospheric pressure, and converting the disodium dicyclodienyl dicarboxylic acid to the free acid by hydrolysis of the disodium salt.

10. A process according to claim 9 in which the monomeric cyclodiene is cyclopentadiene.

11. A process according to claim 9 in which the monomeric cyclodiene is methylcylopentadiene.

References Cited in the file of this patent

UNITED STATES PATENTS 2,563,074   Schmerling _____ Aug. 7, 1951

OTHER REFERENCES

Thiele: Ber. Deut. Chem., vol. 34, pages 68–70 (1901).
Morton et al.: J. Am. Soc., vol. 72, pp. 3785–92 (1950).